United States Patent [19]

Klausmeier

[11] Patent Number: 5,561,663
[45] Date of Patent: Oct. 1, 1996

[54] METHOD AND APPARATUS FOR PERFORMING COMMUNICATION RATE CONTROL USING GEOMETRIC WEIGHTED GROUPS

[75] Inventor: Daniel E. Klausmeier, Sunnyvale, Calif.

[73] Assignee: Stratacom, Inc., San Jose, Calif.

[21] Appl. No.: 366,834

[22] Filed: Dec. 30, 1994

[51] Int. Cl.⁶ .................................................. H04L 12/56
[52] U.S. Cl. ............................... 370/17; 370/84; 370/94.2
[58] Field of Search .......................... 370/84, 60, 60.1, 370/94.1, 94.2, 79, 17; 395/849

[56] References Cited

U.S. PATENT DOCUMENTS

| | | | |
|---|---|---|---|
| 5,224,099 | 6/1993 | Corbalis et al. | 370/94.2 |
| 5,274,643 | 12/1993 | Fisk | 370/94.1 |
| 5,359,592 | 10/1994 | Corbalis et al. | 370/94.1 |
| 5,381,407 | 1/1995 | Chao | 370/60 |
| 5,392,280 | 2/1995 | Zheng | 370/94.2 |
| 5,432,824 | 7/1995 | Zheng et al. | 370/84 |
| 5,455,826 | 10/1995 | Ozveren et al. | 370/84 |

FOREIGN PATENT DOCUMENTS

0598485A3   5/1994   European Pat. Off.

OTHER PUBLICATIONS

CCITT, Papter Entitled: Recommendation I.371, Traffic Control and Congestion Control in B–ISDN, Published Jun. 1992.

"A New QOS–Guaranteed Cell Discarding Strategy: Self–Calibrating Pushout," *1994 IEEE Globecom*, vol. 2, pp. 929–934 (Nov. 28, 1994).

"Optimized ATM Virtual Path Bandwidth Management Under Fairness Contraints," *1994 IEEE Globecom*, vol. 2, pp. 924–928 (Nov. 28, 1994).

*Primary Examiner*—Douglas W. Olms
*Assistant Examiner*—Min Jung
*Attorney, Agent, or Firm*—Blakely, Sokoloff, Taylor & Zafman LLP

[57] ABSTRACT

A method for performing rate control for digital communication systems. A server serves N connection queues where each connection queue has accumulation rate $a_i$. Each credit accumulation rate $a_i$ is divided into a set of binary coefficients. The connections are then divided into connection groups wherein each connection group has group accumulation rate created using the binary coefficients. The connection group accumulation rate is used to maintain a group credit balance $c_j$. To select a connection to be served, the server examines the group credit balances and selects the group with the greatest credit balance. A connection within the selected group is chosen using a round-robin system. Thus the server selects a connection to serve without performing a linear scan over all the connections.

23 Claims, 3 Drawing Sheets

| Step | c1 (a1=3) | c2 (a2=2) | c3 (a3=4) | connection served |
|---|---|---|---|---|
| 1 | 10 | 10 | 10 | c3 |
| 2 | 13 -> 3 | 12 | 4 | c1 |
| 3 | 6 | 14 -> 4 | 8 | c2 |
| 4 | 9 | 6 | 12 -> 2 | c3 |
| 5 | 12 -> 2 | 8 | 6 | c1 |
| 6 | 5 | 10 | 10 -> 0 | c3 |
| 7 | 8 | 12 -> 2 | 4 | c2 |
| 8 | 11 -> 1 | 4 | 8 | c1 |
| 9 | 4 | 6 | 12 -> 2 | c3 |
| 10 | 7 | 8 | 6 | no connections |
| 11 | 10 | 10 | 10->0 | c3 |

*Figure 2 (prior art)*

| Step | $g_0=\{c1\}$ $a_0=1\times2^0=1$ | $g_1=\{c1, c2\}$ $a_1=2\times2^1=4$ | $g_2=\{c3\}$ $a_2=1\times2^2=4$ | connection served |
|---|---|---|---|---|
| 1 | 10 | 10 | 10 -> 0 | c3 |
| 2 | 11 | 14 -> 4 | 4 | c1 |
| 3 | 12 -> 2 | 8 | 8 | c1 |
| 4 | 3 | 12 | 12 -> 2 | c3 |
| 5 | 4 | 16 -> 6 | 6 | c2 |
| 6 | 5 | 10 | 10 -> 0 | c3 |
| 7 | 6 | 14 -> 4 | 4 | c1 |
| 8 | 7 | 8 | 8 | no connections |
| 9 | 8 | 12 | 12 -> 2 | c3 |
| 10 | 9 | 16 -> 6 | 6 | c2 |

*Figure 3*

METHOD AND APPARATUS FOR PERFORMING COMMUNICATION RATE CONTROL USING GEOMETRIC WEIGHTED GROUPS

FIELD OF THE INVENTION

The present invention relates to the field of digital communication. Specifically, a method and apparatus for performing rate control on a set of digital communication lines is disclosed.

BACKGROUND OF THE INVENTION

Cell switching is a method of transmitting digital information wherein the information is broken into equal sized units called "cells." The cells of information are usually grouped into larger units called "frames."

The individual cells of information are transmitted from a source node to a destination node through a "connection." A connection consists of a pathway through a digital network. A digital network is constructed of digital switches coupled together by digital communication lines.

Each cell originates at a source node and is transmitted across the communications lines. The communication lines carry the cells of information between the digital switches along the connection pathway. The digital switches route the cells from incoming communication lines to outgoing communication lines and finally to a destination node coupled to a digital switch.

Each digital switch can be connected to several communication lines. Furthermore, each communication line can carry several different connections simultaneously. Every connection must be served by the digital switch. Serving a connection entails removing an incoming cell from an input queue associated with the connection and sending the cell out on a communication line or to a destination node coupled to the digital switch. A service algorithm is employed to select a connection for service. To fully utilize the bandwidth of a communication line, a cell must be selected for service during each service time. The service time refers to the amount of time it takes to transmit a single cell onto the communication line.

The objective of the service algorithm is to ensure that each connection receives the appropriate amount of service. This can be achieved by controlling the rate at which each connection is served. Current methods of rate control use linear searches to find a connection that is qualified to be served. The time available to complete the search through the list of connections is equal to the service time of a connection. With modern high speed links, this service time is much smaller than service time using older technology. Furthermore, modern high speed links are expected to carry more connections than older technology. Having more connections reduces the amount of time available to scan the list of connections. The combined effect of more connections and less time to service each connection is making it increasingly difficult for technology to keep up using standard linear approaches of rate control.

SUMMARY AND OBJECTS OF THE INVENTION

It is thus an object of the present invention to eliminate the need to perform a linear scan of all the connections in a switch to select one connection for service.

To accomplish this objective, the present invention introduces an alternative method of performing rate control that eliminates the need to perform a linear scan over all the connections. The rate control method of the present invention assigns the credit accumulation rate $a_i$ to each connection i wherein the credit accumulation rate $a_i$ is proportional to the service rate of each connection i. The rate control method divides the credit accumulation rate $a_i$ for each connection into binary coefficients $a_{ij}$ wherein $$a_i = a_{i0} \times 2^0 + a_{i1} \times 2^1 + \ldots + a_{im-1} \times 2^{m-1} = \sum_{j=0}^{m-1} a_{ij} \times 2^j$$

and $a_{ij}=0$ or 1;

The connections are then assigned into a set of j connection groups wherein each connection i is assigned to group j if $a_{ij}=1$.

This transforms the problem from that of serving each connection i at a rate $R_i$ to that of serving each group g at a rate of $R_g=2^g$. This substantially simplifies the problem since the number of groups will be very small relative to the number of connections. For example, a modern switch may manage 1000 to 100,000 connections but would only need approximately 16 groups. Once the transformation of connection into service groups has been made, methods that have been used to control the connection rates may be used to control the rate at which the groups are served instead.

A credit balance $(c_j)$ is then maintained for each connection group j using an accumulation rate defined for the group. Each group accumulation rate defined by $$a_j = x_j \times 2^j$$

wherein $x_j=$ the number of connections in group j.

During each service time unit, each connection group's accumulation rate $(a_j)$ is added to the connection group's credit balance $(c_j)$ and the connection group with the greatest credit balance is selected to be served. One connection within the selected group is then served. The connection within the selected group is chosen using a round-robin system.

Other objects, features and advantages of the present invention will be apparent from the accompanying drawings, and from the detailed description that follows.

BRIEF DESCRIPTION OF THE DRAWINGS

The objects, features, and advantages of the present invention will be apparent from the following detailed description of the preferred embodiment of the invention with references to the following drawings.

FIG. 2 illustrates an example of a prior art credit accumulation system for rate control.

FIG. 3 illustrates an example of the rate control method of the present invention.

DETAILED DESCRIPTION

Figure 1:
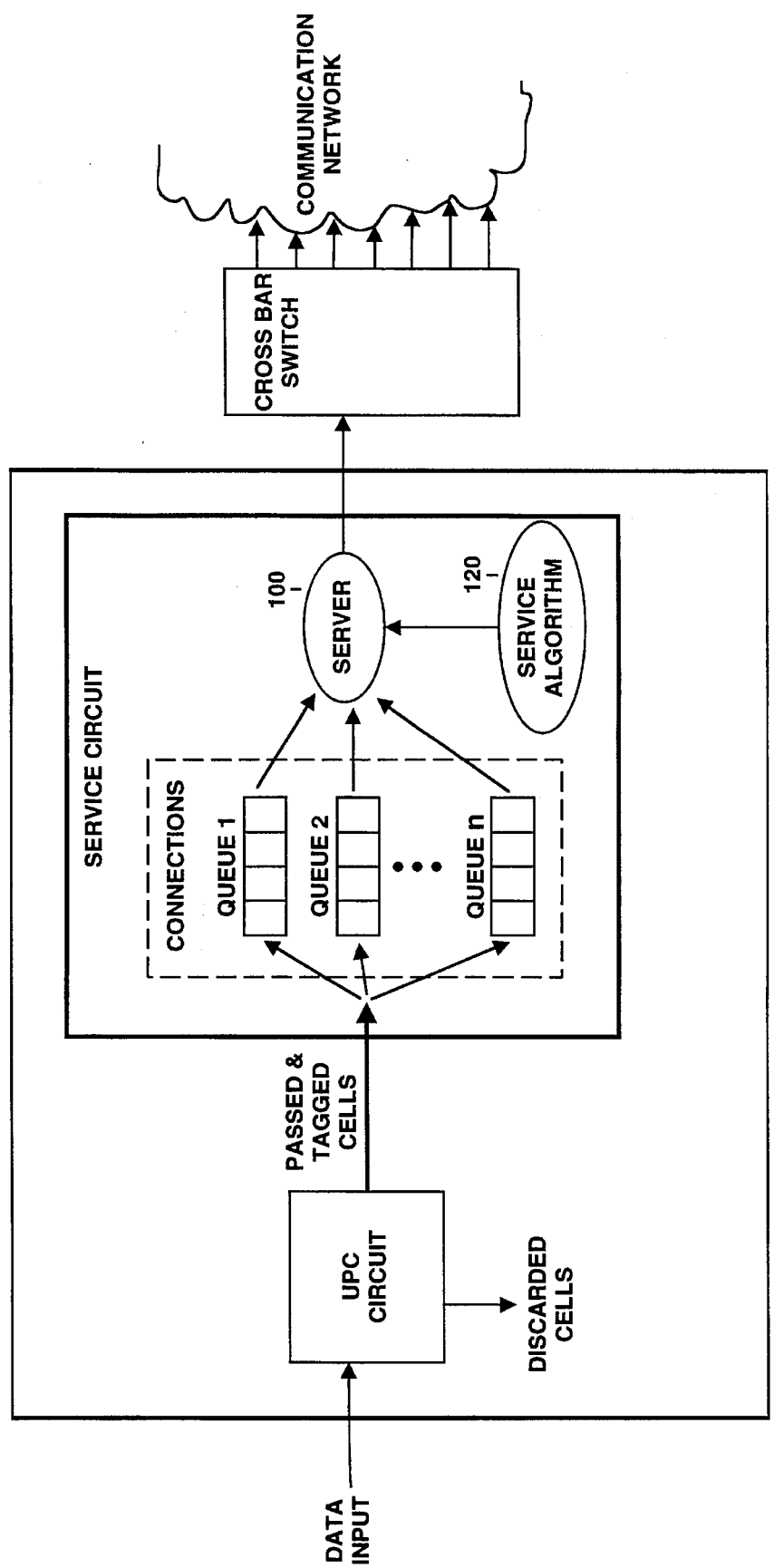
FIG. 1 illustrates a block diagram of a circuit that services several incoming connections.

Methods and apparatus for performing communication rate control using geometric weighted groups are disclosed. In the following description, for purposes of explanation, specific nomenclature is set forth to provide a thorough understanding of the present invention. However, it will be apparent to one skilled in the art that these specific details are not required to practice the present invention. For example, the present invention is disclosed in the context of providing rate control for "connections." However, the rate control system of the present invention can be used to provide rate control on any type of data stream. For example, the rate control system of the present invention can be used to perform rate control on a set of data queues or on a tester generated data stream. Furthermore, well known circuits and devices are shown in block diagram form to avoid obscuring the present invention unnecessarily.

DIGITAL COMMUNICATION

FIG. 1 illustrates a block diagram of a circuit for processing incoming data cells. At the left of FIG. 1 is a Usage Parameter Control circuit. The Usage Parameter Control circuit monitors the rate of incoming data cells and determines if the incoming data cells are exceeding the allowed data rate. An example of a Usage Parameter Control circuit is disclosed in the copending application "Frame Based Usage Parameter Control For a Digital Switch", filed Mar. 21, 1995, Ser. No. 08/408,273.

After passing through the Usage Parameter Control circuit, each data cell is placed into a queue until the data cell is served. Each connection has an associated queue such that there are an equal number of connections and queues. All of the connection queues are serviced by a queue server 100.

A service algorithm 120 is coupled to the queue server 100 and controls the queue server 100. The service algorithm 120 determines when each virtual queue will be served. Thus it is the service algorithm 120 that performs the rate control.

LINEAR SCAN OF CONNECTIONS USING CREDIT ACCUMULATION

One example of an existing method for performing rate control on a digital communication line uses a credit accumulation system. In a credit accumulation system, each connection accumulates credits at a rate that is proportional to its service rate. This is the credit accumulation rate denoted by $a_i$ for connection i. Each connection also has a threshold of credits that qualifies the connection to be served, when the credit balance for a connection reaches the threshold then that connection is served. Once served, that connection will have its credit balance reduced by an amount P which is proportional to the available bandwidth of the communication line such that $a_i/P$ is the fraction of the total bandwidth assigned to connection i. Other existing rate control systems for digital communication lines implement a credit accumulation system.

For example, consider a connection (connection i) with a credit balance denoted by $c_i$. When connection i is served, the credit balance $c_i$ for connection i will be reduced by P credits, where P is the price to have the connection served. During each unit of service time (the time it takes for the server to serve a connection, i.e. transmit a cell), connection i will accumulate a percentage of P credits equivalent to the percent of the server capacity that it has allocated. The following equation defines the credit balance for connection i wherein connection i has a credit accumulation rate of $a_i$.

EQUATION 1

$$c_i(n) = c_i(n-1) + a_i - Ps_i(n)$$

wherein i= the connection number $c_i(n)$= credit balance for connection i at time unit n $a_i$= accumulation rate for connection i (percent of server capacity dedicated to connection i times P)

P= price of servicing the connection i $s_i(n)$ = service function
 = 1 if connection i was served during service time unit n
 = 0 if connection i was not served during service time unit n All connections in a system have their credit balance updated using the same equation. The service algorithm may use the credit balances of the connections to select which connection will be served next. Several different methods may be used to select a connection when more than one connection exceeds the service threshold and thus qualifies for service. Alternatively, more than one connection may be served.

One method to select a single connection to be served when more than one connection exceeds the service threshold is to select the connection having the largest credit balance. This method, in effect, selects the connection that is "most overdue" to be served.

FIG. 2 illustrates a table containing an example of a simple credit accumulation service algorithm. In the example of FIG. 2, three connections are shown (c1, c2, c3) with each given a fraction of the total bandwidth of the communication line equal to 0.3, 0.2, and 0.4, respectively. FIG. 2 lists the credit balances $c_i$ for each of the four connections during ten consecutive service time units. For this example, P is set equal to 10. Also, the limit L is set equal to P to ensure that the credit balances do not drop below 0.

As illustrated, each connection is served the right proportion of time. Note also that service time 11 is identical to service time 1 such that the same sequence will repeat.

A serious disadvantage with the rate control system disclosed above is that the credit balance of every connection in the system must be scanned during each service time unit to determine which connection has the greatest number of credits. Furthermore, after selecting the connection to serve, the credit balance for every connection must be updated. Thus, if there are thousands of connections, the system must scan and update thousands of credit balances during each service time. For a system with a large number of connections, it may be impossible to serially scan through and update the entire list of connections during a single service time unit.

For example, if the time to serve a cell (one service time unit) is 10 micro-seconds (typical for T3 communication lines), and there are 1000 connections in the system, then there is only 10 nanoseconds per connection to update the credit balance of the connection and compare the credit balance to determine if the connection should be served. Multiple parallel circuits may be used to give more service time per connection but as the service time unit is reduced with higher speed communication lines and the number of connections is increased, even this approach is no longer feasible.

A RATE CONTROL APPROACH USING GEOMETRIC WEIGHTED GROUPS

The present invention introduces an alternative rate control approach that does not exhibit the problems of the prior art rate control system disclosed in the previous section. The rate control approach of the present invention uses geometric weighted groups to organize connections into multiple groups. Instead of scanning and maintaining a credit balance for each individual connection, the scheme of the present invention scans and maintains a credit balance for each group of connections. As will be disclosed, the number of connection groups required is independent of the number of connections. Thus, the number of connection groups in a system can be kept small even if there is a large number of connections.

The alternative rate control scheme of the present invention is easiest to describe by considering a binary representation of the credit accumulation rate for each connection. However, other divisions of the credit accumulation rate could also be used. The binary representation of the credit accumulation rate for a connection i can be represented as:

$$a_i = a_{i0} \times 2^0 + a_{i1} \times 2^1 + \ldots + a_{im-1} \times 2^{m-1} = \sum_{j=0}^{m-1} a_{ij} \times 2^j \quad \text{Equation 2}$$

wherein $a_{ij}=0$ or 1

To implement the rate control scheme of the present invention, m groups g0, g1, ..., gm−1 of connections are maintained. To program a rate for connection i, that connection will be entered into connection group $g_j$ if the corresponding $a_{ij}$ for that connection is a 1. Thus, each connection may be entered in more than one connection group. For example, if a connection i has an accumulation rate of 5 ($a_i=5$), the connection will be entered into connection groups 0 and 2:

$$a_i=5=a_{i0}\times 2^0+a_{i1}\times 2^1+a_{i2}\times 2^2=1\times 2^0+0\times 2^1+1\times 2^2$$

In the rate control scheme of the present invention, a credit balance $c_j$ is maintained for each connection group instead of maintaining a credit balance for each connection. During each service time unit, the number of credits accumulated by each connection group will be equal to the number of entries in the group times the weight factor for the connection group. The weight factor for each connection group j is $2^j$ when the connections have their accumulation rates split up using binary coefficients. Therefore, the accumulation rate ($a_j$) for connection group j can be represented as:

EQUATION 3

$$a_j=x_j\times 2^j$$

wherein j = the connection group number $a_j$ = accumulation rate for connection group j during each time unit $x_j$ = number of connections in connection group j During each service time unit, a connection group j qualifies for service if the associated group credit balance $c_j$ is greater than the service threshold. A connection group is selected and has its credit balance reduced by P (the price to be served). If a single connection within the selected connection group j is served, then each time the selected connection group j is served a different connection within the group will be selected for service using a round-robin system.

FIG. 3 illustrates an example of the rate of control approach of the present invention using the same connection parameters as the example in FIG. 2 (i.e. connection 1 (c1) is assigned 30% of the bandwidth such that $a_1=3$; connection 2 (c2) is assigned 20% of the bandwidth such that $a_2=2$; and connection 3 (c3) is assigned 40% of the bandwidth such that $a_3=4$). Each of the connections are entered into the three connection groups ($g_0$, $g_1$, and $g_2$) as appropriate. The accumulation rate for each connection group $g_j$ is listed above each column.

FIG. 3 lists the credit balances $c_j$ for the three connection groups for during ten consecutive service time units. During each time unit, a connection group having a credit balance $c_j$ exceeding file service threshold is selected for service and its credit balance reduced by 10 credits. When the selected connection group $g_j$ is served, only one of the connections within the group is served. After serving the selected connection from the selected connection group $g_j$, the respective credit balances for all the connection groups are increased using each group's respective credit accumulation rate. As illustrated in FIG. 3, each connection is served the appropriate number of times.

Note that in the example illustrated in FIG. 3, when a connection group is served, only one of the connections within the connection group is served. The rate control system rotates through each connection within a connection group in a round-robin fashion. An alternative method of servicing a selected connection group $g_j$ would be to serve all the connections in the selected connection group $g_j$. If all the connections in the selected connection group $g_j$ were served, the accumulation rate for connection group j would be set to $2^j$.

As illustrated in the example in FIG. 3, the number of items to scan during each service period is equal to the number of connection groups. This is in contrast to the prior art example given in FIG. 2 which required all the connections be scanned during each service period to select one connection for service. Furthermore, using the disclosed rate control algorithm, the number of groups necessary will be independent of the number of connections.

To determine the number of connection groups that will be required, the following equation can be used:

$$J = \text{number of groups required} = \left\lceil \log_2 \frac{bw_{max}}{gran_{min}} \right\rceil \quad \text{Equation 4}$$

wherein $bw_{max}$ = the maximum bandwidth that may be assigned to any given channel $gran_{min}$ = the minimum desired granularity of the assigned channel bandwidths

[] = indicates round up to the nearest integer

To illustrate by example, consider the case of an Asynchronous Transfer Mode (ATM) system wherein the minimum desired granularity of any channel is 10 cells per second. In such an ATM system, the data is transmitted at 155 Mbit/sec. At 155 Mbit/sec, the maximum desired bandwidth on any channel will be approximately 365,000 cells per second. Using Equation 4, the number of connection groups required is:

$$J = \left\lceil \log_2 \frac{365,000}{10} \right\rceil = \lceil \log_2 36,500 \rceil = 16 \text{ groups}$$

Thus, in a system with a maximum desired channel bandwidth of 365,000 cells per second and a minimum desired granularity of any channel of 10 cells per second, only sixteen connection groups would be required. This will be true regardless of the number of connections in the system and thus illustrates a significant benefit for modern systems that manage thousands of different connections. In the above example, the price of service would be set to the number of cells that can be served in one-tenth of a second (365,000). The accumulation rate for each connection would equal the number of cells transmitted for that connection during the one-tenth of a second service time.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method of performing rate control on a set of N connections, each of said N connections sharing an available bandwidth of P by having an assigned bandwidth of $a_i$ such that each connections' fraction of the total bandwidth is equal to $a_i/P$, said method comprising the steps of:

dividing said set of N connections into a set of M connection groups wherein each connection can be added to more than one connection group j;

assigning an connection group bandwidth $a_j$ to each of said M connection groups; and selecting connection groups to serve such that each connection group receives its assigned connection group bandwidth of $a_j$.

2. The method as claimed in claim 1 further comprising the steps of:

assigning an connection group credit balance $c_j$ for each connection group j;

adding the connection group bandwidth $a_j$ of each connection group j to the connection group credit balance $c_j$ of each connection group j; and selecting an connection group to serve using the connection group credit balances $c_j$ of said M connection groups.

3. The method as claimed in claim 2 wherein said step of selecting an connection group to be served comprises selecting an connection group that exceeds an associated service threshold.

4. The method as claimed in claim 3 wherein said step of selecting an connection group to be served further comprises selecting an connection group with the greatest credit balance.

5. The method as claimed in claim 2 wherein only one connection is served from a connection group when that connection group is selected for service.

6. The method as claimed in claim 5 wherein said step of serving an connection group comprises serving one connection in said selected connection group using a round-robin approach.

7. The method as claimed in claim 2 wherein more than one connection is served from a connection group when that connection group is selected for service.

8. The method as claimed in claim 1 further comprising the steps of:

dividing the assigned bandwidth $a_i$ for each connection i into a set of sub bandwidths $a_{ij}$ wherein $a_i = a_{i0} \times w_0 + a_{i1} \times w_1 + \ldots + a_{iM-1} \times w_{M-1} =$ $$\sum_{j=0}^{M-1} a_{ij} \times w_j$$

and $w_j$=A weight factor for connection group $j_i$;

placing connection i into connection group j if $a_{ij}$ does not equal zero; and setting the connection group bandwidth $a_j$ for each connection group j using $$a_j = \sum_{i=0}^{N} a_{ij} \times w_j.$$

9. The method as claimed in claim 8 further comprising the steps of:

assigning an connection group credit balance $c_j$ for each connection group j;

adding the connection group bandwidth $a_j$ of each connection group j to the connection group credit balance $c_j$ of each connection group j; and selecting an connection group to serve using the connection group credit balances $c_j$ of said M connection groups.

10. The method as claimed in claim 8 wherein $w_j$ equals $2^j$.

11. The method as claimed in claim 8 wherein $w_j$ equals $n^j$.

12. The method as claimed in claim 8 further comprising the step of:

serving each connection i in each connection group j such that each connection i receives a fraction of connection group j's assigned bandwidth equal to $[(a_{ij} \times W_j)/a_j]$ $$\frac{(a_{ij} \times w_j)}{a_j}.$$

13. The method as claimed in claim 11 wherein the number M of connection groups required is defined by $$M = \text{number of groups required} = \left[ \log_n \frac{bw_{max}}{gran_{min}} \right]$$

wherein $bw_{max}$ = the maximum bandwidth that may be assigned to any given connection;

$gran_{min}$ = the minimum desired granularity of the assigned connection bandwidths; and

[ ] = indicates round up to the nearest integer.

14. An apparatus for performing rate control on a set of N connections, each of said N connections having an bandwidth of $a_i$, said apparatus comprising:

a front end circuit for receiving incoming data cells;

a plurality of queues for storing incoming data cells from said N connections;

a server for serving said incoming data cells on said queues; and a service controller, said service controller comprising
means for dividing said set of N connections into a set of M connection groups wherein each of said connections may be added to more than one connection group;

means for assigning a group bandwidth $a_j$ for each connection group; and means for servicing said connection groups such that each connection group receives its assigned group bandwidth $a_j$.

15. The apparatus as claimed in claim 14 wherein said service controller further comprises:

a group credit balance $c_j$ counter for each connection group j; means for adding the group bandwidth $a_j$ of each connection group j to the group credit balance $c_j$ counter of each connection group j; and means for selecting a group to serve using said group credit balance $c_j$ counters.

16. The apparatus as claimed in claim 14 wherein said service controller further comprises:

means for dividing the bandwidth $a_i$ for each connection i into a set of sub bandwidth rates $a_{ij}$ wherein $$a_i = a_{i0} \times w_0 + a_{i1} \times w_1 + \ldots + a_{iM-1} \times w_{M-1} = \sum_{j=0}^{M-1} a_{ij} \times w_j$$

and $w_j$=A weight factor for connection group $j_i$ means for placing each connection i into at least one connection group j wherein connection i is assigned to connection group j if $a_{ij}$ does not equal zero; and means for assigning a group bandwidth $a_j$ to each connection group j, said group bandwidth rate defined by $$a_j = \sum_{i=0}^{N} a_{ij} \times w_j.$$

17. The apparatus as claimed in claim 16 wherein each $w_j$ equals $2^j$.

18. The apparatus as claimed in claim 16 wherein each $w_j$ equals $n^j$.

19. The apparatus as claimed in claim 15 wherein said means for selecting a connection group to be served selects a connection group that exceeds an associated service threshold.

20. The apparatus as claimed in claim 19 wherein said means for selecting a connection group to be served selects a connection group that has the greatest credit balance.

21. The apparatus as claimed in claim 19 wherein said means for serving a connection serves a single connection in said selected connection group to be served using a round-robin approach.

22. The apparatus as claimed in claim 19 wherein said means for serving a connection serves more than one connection in said selected connection group.

23. The apparatus as claimed in claim 18 wherein the number M of connection groups required is defined by $$M = \text{number of groups required} = \left\lceil \log_m \frac{bw_{max}}{gran_{min}} \right\rceil$$

wherein $bw_{max}$ = the maximum bandwidth that may be assigned to any given channel;

$gran_{min}$ = the minimum desired granularity of the assigned channel bandwidths; and

[ ]= indicates round up to the nearest integer.

* * * * *